(12) United States Patent
Gao

(10) Patent No.: US 8,271,273 B2
(45) Date of Patent: Sep. 18, 2012

(54) ADAPTIVE APPROACH TO IMPROVE G.711 PERCEPTUAL QUALITY

(75) Inventor: Yang Gao, Mission Viejo, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 1051 days.

(21) Appl. No.: 12/203,052

(22) Filed: Sep. 2, 2008

(65) Prior Publication Data

US 2009/0094037 A1    Apr. 9, 2009

Related U.S. Application Data

(60) Provisional application No. 60/997,663, filed on Oct. 4, 2007.

(51) Int. Cl.
*G10L 21/00* (2006.01)
*G10L 19/00* (2006.01)
*G10L 21/04* (2006.01)

(52) U.S. Cl. ........ 704/219; 704/201; 704/500; 704/501; 704/502

(58) Field of Classification Search .............. 704/219
See application file for complete search history.

(56) References Cited

U.S. PATENT DOCUMENTS

| | | | |
|---|---|---|---|
| 6,459,729 B1 * | 10/2002 | Lai | 375/231 |
| 6,704,355 B1 * | 3/2004 | Lai | 375/231 |

* cited by examiner

*Primary Examiner* — Justin Rider
(74) *Attorney, Agent, or Firm* — Huawei Technologies Co., Ltd.

(57) ABSTRACT

In order to achieve the best improvement of ITU G.711 related codec perceptual quality, perceptual weighting controlling parameter(s) should be at least adaptive to relative quantization error statistics or adaptive to signal level. When the relative quantization error statistics are larger or the signal level is lower, the perceptual weighting should be "stronger", which means α in (5) is smaller; when the relative quantization error statistics are smaller or the signal level is larger, the perceptual weighting should be "weaker", which means α in (5) is larger.

9 Claims, 9 Drawing Sheets

Improved G.711 Codec with Perceptual Weighting

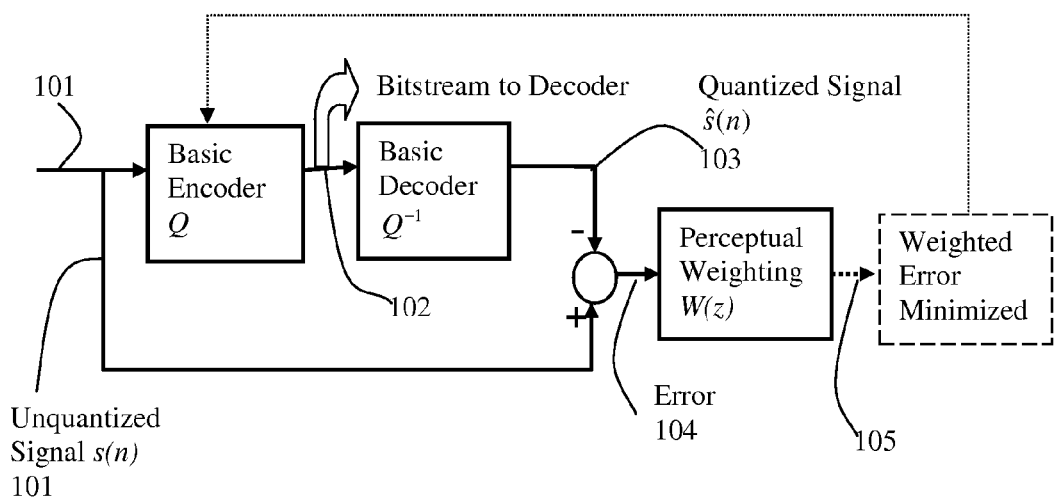
FIG. 1 General Principle of Closed-Loop Encoder system Using Perceptual Weighting Filter

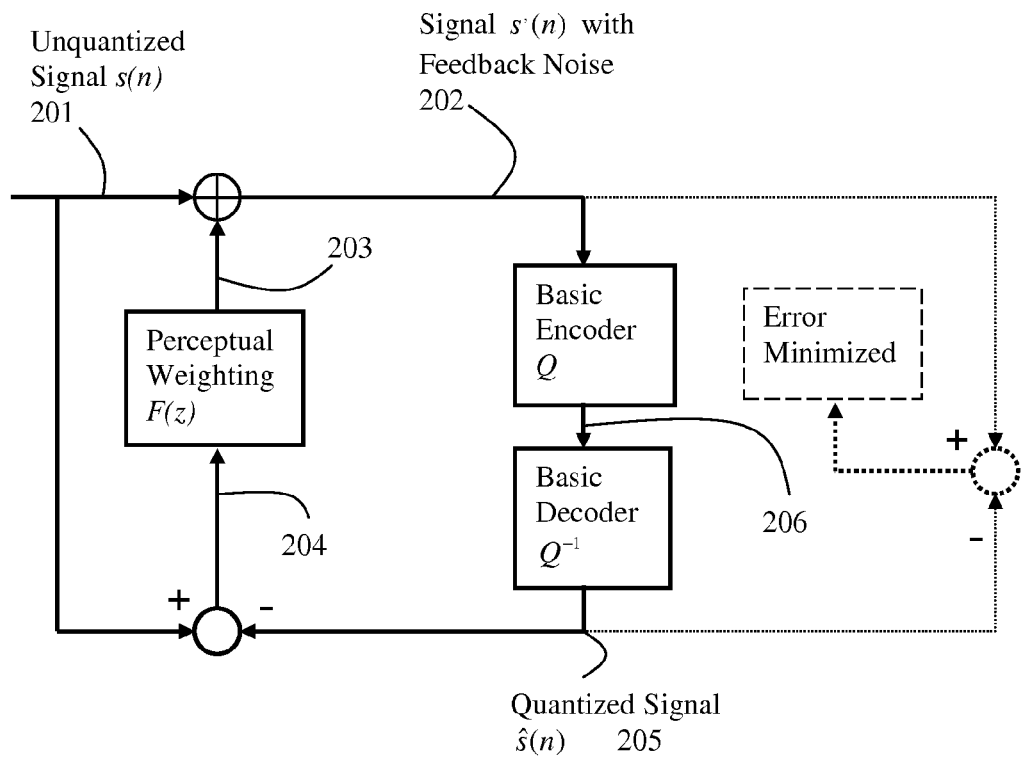
FIG. 2 General Principle of Perceptual Weighting Filter Acting as Noise-Feedback Solution

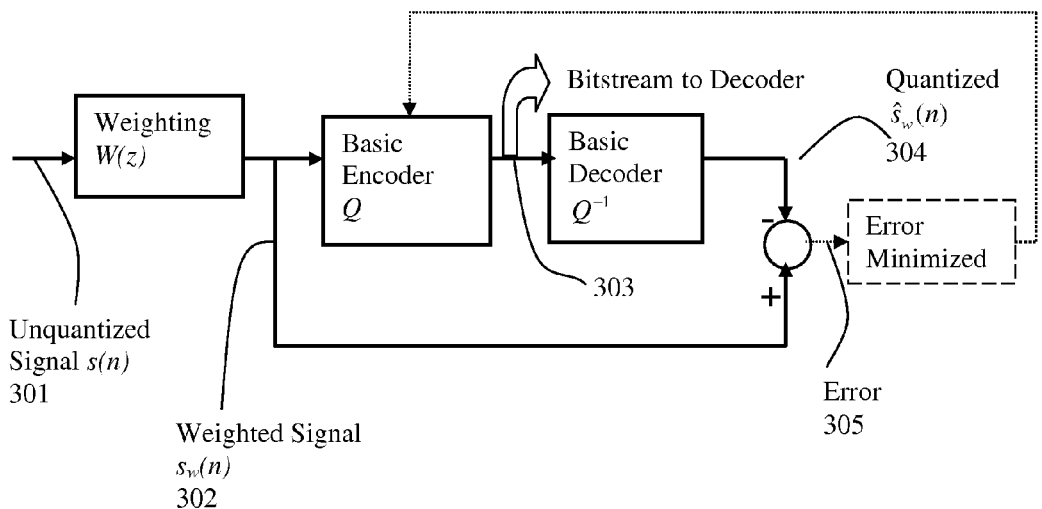
FIG. 3 General Principle of Quantizing(Encoding) Weighted Signal
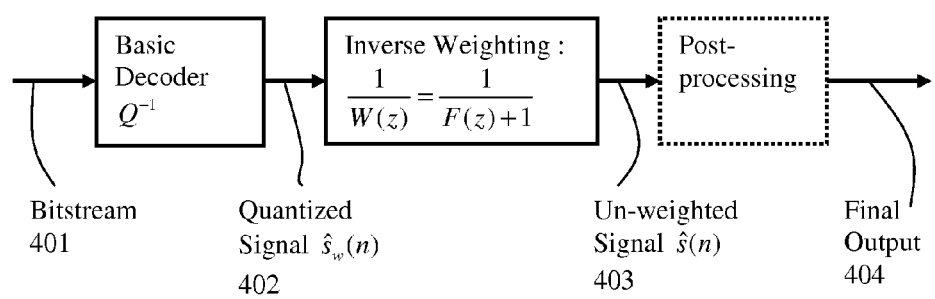
FIG.4 Decoder with Inverse Weighting Filter

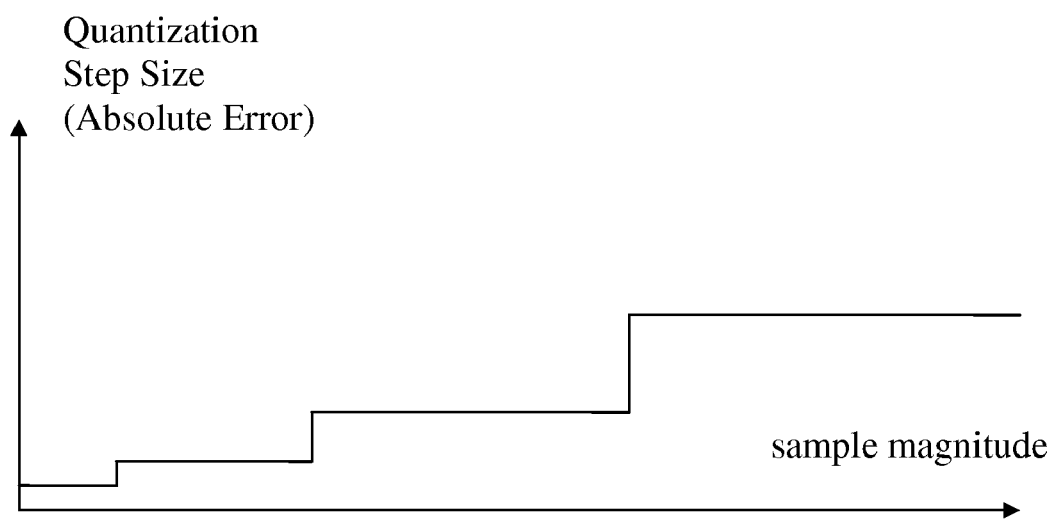
FIG. 5  Quantization Step Size (Absolute Error) versus Signal Sample Magnitude for G.711.

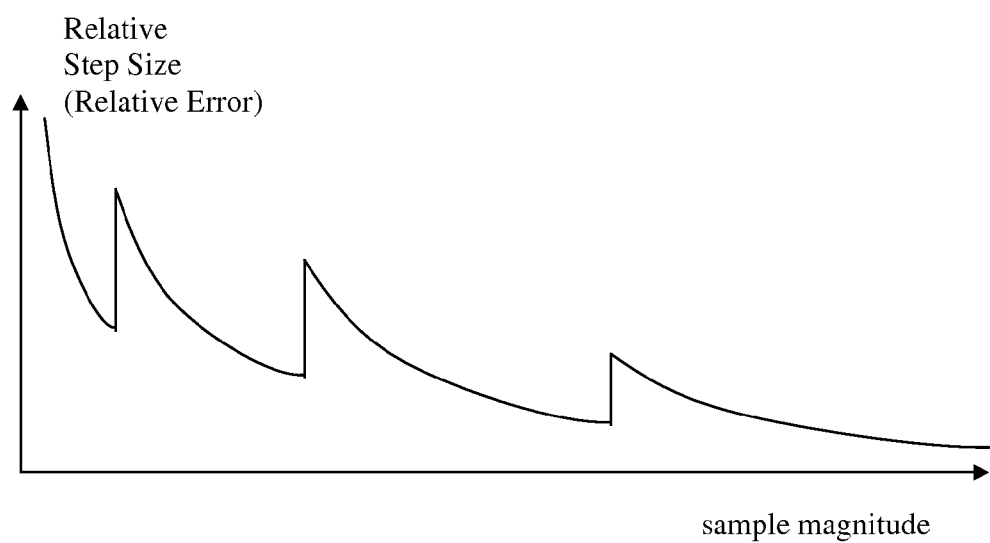
FIG. 6  Relative Step Size (Relative Error) versus Signal Sample Magnitude for G.711.

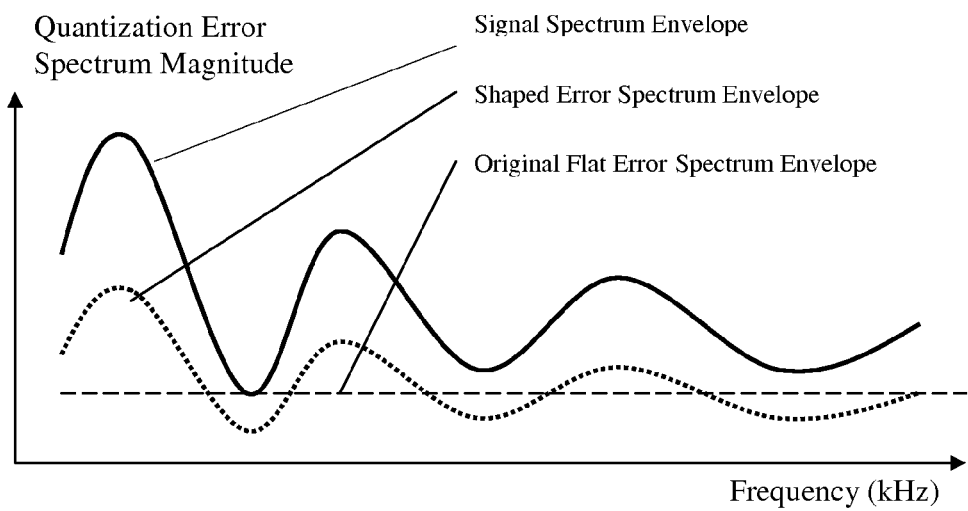
FIG.7 Quantization Error Spectrum with Original G.711 and Perceptual Weighting of G.711.

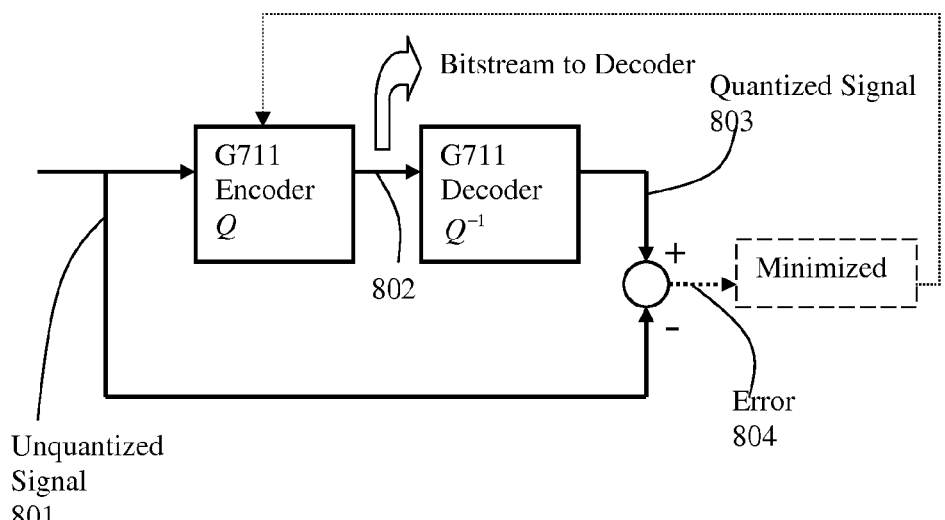
FIG.8 Original G711 Codec Principle
Without Perceptual Weighting Filter

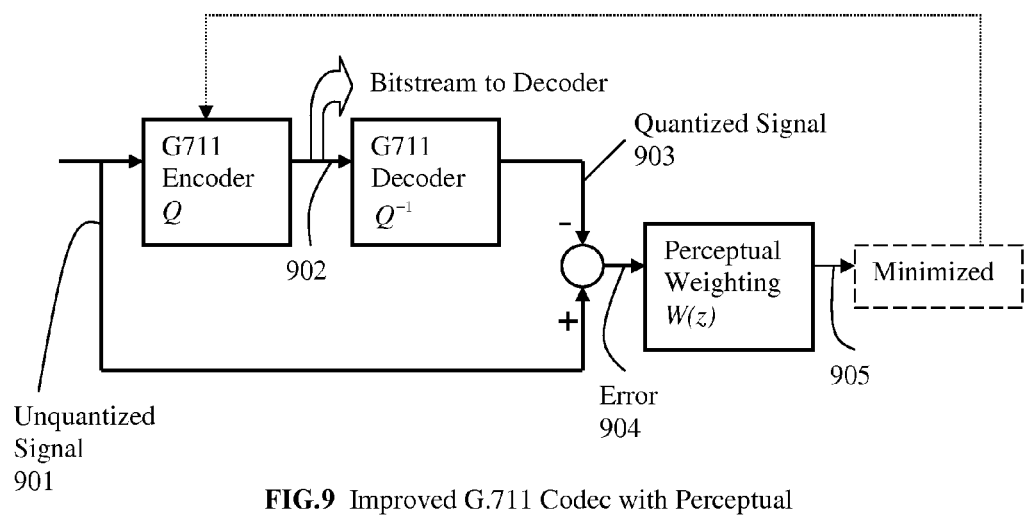
FIG.9 Improved G.711 Codec with Perceptual Weighting

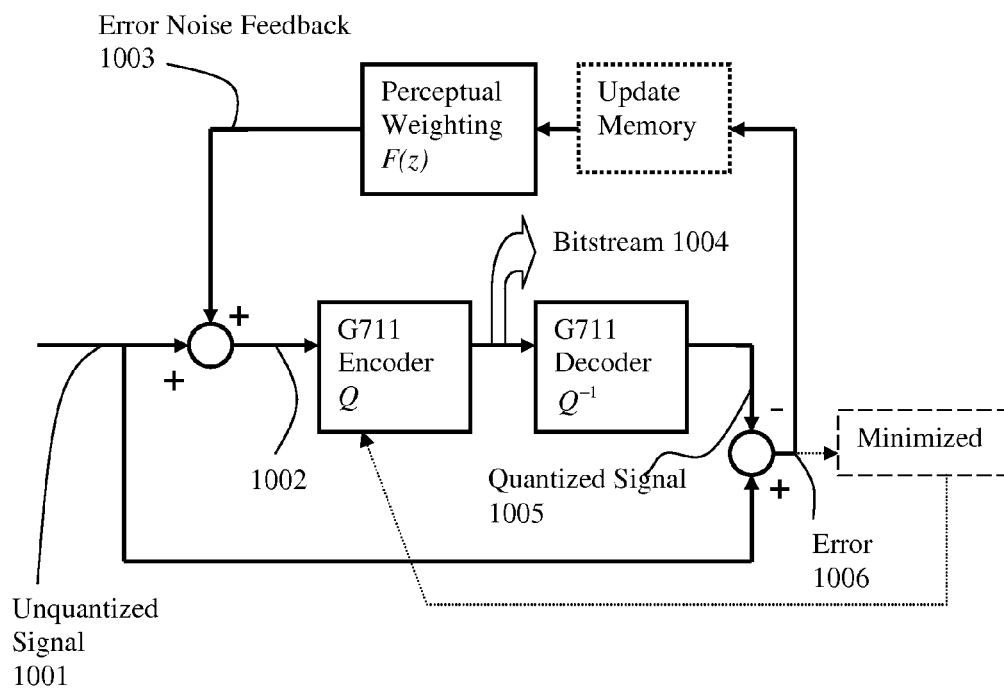
FIG.10 Improved G.711 Codec with Quantization Error Noise Feedback

ADAPTIVE APPROACH TO IMPROVE G.711 PERCEPTUAL QUALITY

CROSS REFERENCE TO RELATED APPLICATIONS

U.S. Pat. No. 7,233,897
U.S. application Ser. No. 12/177,370

BACKGROUND OF THE INVENTION

1. Field of the Invention

The present invention is generally in the field of signal coding. In particular, the present invention is in the field of speech/signal coding and specifically in the application where ITU G.711 A-law or μ-law codec is involved.

2. Background Art

ITU G.711

G.711 is an old ITU speech and audio codec standard which has been widely used in communication systems. G.711 is PCM based codec. Every signal sample is encoded with 8 bits. If the sampling rate is 8 kHz, the resulting codec bit rate is 64 kb/sec. Two encoding laws are recommended and these are commonly referred to as the A-law and the μ-law. The definition of these laws is given in Tables published in the ITU recommendation. When using the μ-law in networks where suppression of the all 0 character signal is required, the character signal corresponding to negative input values between decision values numbers 127 and 128 should be 00000010 and the value at the decoder output is −7519. The corresponding decoder output value number is 125. The number of quantized values results from the encoding law. Digital paths between countries which have adopted different encoding laws should carry signals encoded in accordance with the A-law. Where both countries have adopted the same law, that law should be used on digital paths between them. Any necessary conversion will be done by the countries using the μ-law. The rules for conversion are given in the ITU publication. Every "decision value" and "quantized value" of the A (resp. μ) law should be associated with a "uniform PCM value". (For a definition of "decision value" and "quantized value", see ITU Recommendation G.701 and in particular FIG. 2/G.701). This requires the application of a 13 (14) bit uniform PCM code. The mapping from A-law PCM, and μ-law PCM, respectively, to the uniform code is given in the ITU publication. The conversion to A-law or μ-law values from uniform PCM values corresponding to the decision values, is left to the individual equipment specification. One option is described in ITU Recommendation G.721, §4.2.8 subblock COMPRESS.

Perceptual Weighting Filter

Perceptual weighting filtering is a technology which explores human ear masking effect to improve perceptual quality of signal coding or speech coding. This technology has been widely used in many standards during recent decades. One typical application of perceptual weighting is shown in FIG. 1; the examples of this application can be found in G.729, G.723.1 and many other standards. In FIG. 1, 101 is unquantized original signal which is the input to encoder and also the reference signal for the quantization error estimation. 102 is the output bitstream from encoder, which needs to be transmitted to decoder. The decoder outputs quantized signal (or decoded signal) 103, which is used to estimate quantization error 104 in encoder. Then, the direct error 104 passes through weighting filter to get weighted error 105. Instead of minimizing the direct error, the weighted error 105 is minimized so that the spectrum shape of the direct error fits human ear marking effect. Because decoder is placed in encoder, the whole system is often called closed-loop approach or analysis-by-synthesis method, which mathematically minimizes the following error energy, $$\mathrm{Min}\{E_w\} = \mathrm{Min}\Big\{\sum_n \|[s(n) - \hat{s}(n)] * h_W(n)\|^2\Big\}, \quad (1)$$

where * means mathematical convolution; $h_w(n)$ is the impulsive response of weighting filter W(z). (1) can be re-written in another form:

$$\mathrm{Min}\{E_w\} = \mathrm{Min}\Big\{\sum_n \|[s(n) - \hat{s}(n)] * h_F(n) + s(n) - \hat{s}(n)\|^2\Big\}, \quad (2)$$

where $h_F(n)$ is the impulsive response of the modified weighting filter F(z)=W(z)−1. The equation (2) can be expressed in the diagram shown in FIG. 2; 201 is original unquantized signal; 205 is quantized signal; 206 is bitstream which should be transmitted to decoder; 204 is direct error; 203 is weighted error also called feedback noise or noise feedback; 202 is unquantized signal with added feedback noise. The principle shown in FIG. 2 is basically equivalent to the one in FIG. 1.

The above presented weighting filter is used in encoder side only. This paragraph will describe the usage of weighting filter in both encoder and decoder; such an example can be seen in ITU G.729.1 and other standards. FIG. 3 gives the typical example of employing weighting filter in both encoder and decoder. 301 is unquantized signal which goes through a weighting filter W(z) to get unquantized weighted signal 302; the couple of quantizer (encoder) and de-quantizer (decoder) works on the weighted signal to obtain quantized weighted signal 304; bitstream 303 from encoder is sent to decoder; the minimization of the error 305 is based on the weighted domain. FIG. 4 shows the decoder which corresponds to the encoder explained in FIG. 3. Bistream 401 from transmission channel is the input to the decoder (de-quantizer) which first reproduces the quantized weighted signal 402; then the inverse weighting filter $W(z)^{-1}$ is applied to change the weighted signal 402 back to normal signal domain 403; a post-processor is often followed to improve the final signal output 404.

All above mentioned weighting filters are normally estimated on unquantized original signal in encoder or quantized original signal in decoder.

This invention proposes a way to control weighting filter parameters; in particular, the invention is used to improve the quantizer (encoder) and/or de-quantizer (decoder), which is related to ITU standard G.711.

SUMMARY OF THE INVENTION

This invention proposes a way to control weighting filter parameters; in particular, the invention is used to improve the quantizer (encoder) and/or de-quantizer (decoder), which is related to ITU standard G.711. When relative quantization error is larger or signal level is very low, perceptual weighting filter should be tuned in one way; when relative quantization error is small or signal level is high, perceptual weighting filter should be tuned in another (opposite) way.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1 shows general principle of closed-loop encoder system using perceptual weighting filter.

FIG. 2 shows general principle of perceptual weighting filter acting as equivalent Noise-Feedback solution.

FIG. 3 shows general principle of quantizing (encoding) weighted signal in encoder.

FIG. 4 shows the decoder corresponding to the encoder in FIG. 3 with the Inverse Weighting Filter.

FIG. 5 shows quantization step size (absolute error) versus signal sample magnitude for G.711.

FIG. 6 shows relative step size (relative error) versus signal sample magnitude for G.711.

FIG. 7 shows quantization error spectrum of original G.711 and improved G.711 with perceptual weighting.

FIG. 8 shows original G711 codec principle without perceptual weighting filter.

FIG. 9 shows improved G.711 codec with perceptual weighting.

FIG. 10 shows improved G.711 codec with quantization error Noise Feedback.

FIG. 9 is exactly the same as FIG. 1, except the only difference in FIG. 9 from FIG. 1 is that the general codec in FIG. 1 is replaced by the specific codec G.711 in FIG. 9. FIG. 10 also comes from FIG. 2 by replacing the general codec with the specific codec G.711. In the similar way as FIG. 9 and FIG. 10, the other two figures may be generated by replacing the general codec in FIG. 3 and FIG. 4 with the specific codec of G.711. For the simplicity, these two figures are not repeated here.

DETAILED DESCRIPTION OF THE INVENTION

1. Characteristics of G.711 with General Weighting Filters

G.711 is a very old ITU speech and audio codec standard which is widely used in communication systems. G.711 is PCM based codec. Every signal sample is encoded with 8 bits. At the sampling rate of 8 kHz, the resulting bit rate is 64 kb/sec. G.711 can be used alone or works as a core layer of scalable codecs. There are two coding schemes for G.711; one is called A-Law; another one is called µ-Law. They are all scalar quantization approach. The quantization step size is changed according to the sample magnitude, which could be 8, 16, 32, 64, . . . etc. If we define absolute quantization error and relative quantization error as followings, $$\text{Absolute Error} = |s(n) - \hat{s}(n)|, \quad (3)$$

$$\text{Relative Error} = \frac{|s(n) - \hat{s}(n)|}{|s(n)|}, \quad (4)$$

where s(n) is unquantized original signal sample entering G.711 encoder and ŝ(n) is quantized original signal sample outputting from G.711 decoder, the statistical absolute error is determined by the quantization step size. Both A-law and µ-law coding schemes generate larger absolute errors and smaller relative errors in high signal level area; they produce smaller absolute errors and larger relative errors in low signal level area. FIG. 5 shows the relationship between quantization step size (absolute error) and signal sample magnitude. FIG. 6 shows the relationship between relative step size (relative error) and signal sample magnitude. The signal perceptual quality depends on relative error rather than absolute error; that is why the low level signal generated by G.711 codec sounds much worse than high level signal.

It is well known that perceptual weighting technology (or quantization noise feedback technology), which uses human ear masking effect, can improve the perceptual quality resulted by any speech or audio codecs. The quantization error spectrum with the original G.711 is flat as shown in FIG. 7. The perceptual weighting or quantization noise feedback technology makes the quantization error spectrum shape somehow follow the original signal spectrum so that SNR is similar or closer each other in different spectrum area (see FIG. 7).

FIG. 8 presents original G.711 codec principle. 801 is original unquantized signal; bitstream 802 from G.711 encoder is sent to G.711 decoder; the quantized signal 803 from the decoder can be used to estimate the quantization error 804 in the encoder. The "minimized" block is dashed because actually there is no such isolated block existing in the algorithm; both the encoding and the decoding are simply based on the specific quantization Tables or Rules published by ITU.

FIG. 9 describes improved G.711 codec with perceptual weighting technology. FIG. 9 is exactly the same as FIG. 1, except the only difference in FIG. 9 from FIG. 1 is that the general codec in FIG. 1 is replaced by the specific codec G.711 in FIG. 9; 901 is original unquantized signal; bitstream 902 from G.711 encoder is sent to G.711 decoder; the quantized signal 903 from the decoder can be used to estimate the direct quantization error 904 in the encoder; the direct error goes through weighting filter to get weighted error 905 which is minimized. The "minimized" block is dashed because actually there is no such isolated block existing in the algorithm.

FIG. 10 shows improved G.711 codec with quantization error Noise Feedback approach. Again, FIG. 10 is exactly the same as FIG. 2, except the only difference in FIG. 10 from FIG. 2 is that the general codec in FIG. 2 is replaced by the specific codec G.711 in FIG. 10; 1001 is original unquantized signal; 1002 is noise-feedback added unquantized signal; 1003 is weighted noise feedback signal; bitstream 1004 from G.711 quantizer (encoder) is sent to G.711 de-quantizer (decoder); the quantized signal 1005 from the decoder can be used to estimate the direct quantization error 1006 in the encoder; the direct error goes through weighting filter F(z) to get the weighted noise-feedback error 1003. The "minimized" block is dashed because actually there is no such isolated block existing in the algorithm; both the encoding and the decoding are simply based on the specific quantization Tables or Rules published by ITU. As already mentioned, both technologies in FIG. 9 and FIG. 10 are conceptually equivalent.

In similar way as FIG. 9 and FIG. 10, the other two figures can be generated by replacing the general codec in FIG. 3 and FIG. 4 with the specific codec of G.711. For the simplicity, these two figures are not repeated here.

2. Improved Perceptual Weighting Filter

The perceptual weighting filter can be expressed as W(z, α), here the parameter α is traditionally a constant (0≦α≦1) which controls how "strong" the weighting should be. A typical example weighting filter could be $$W(z) = W(z, \alpha) = A(z/\alpha), \quad (5)$$

$$A(z) = 1 + \sum_{i=1}^{P} a_i \cdot z^{-i}, i = 1, 2, \ldots, P, \quad (6)$$

-continued $$A(z/\alpha) = 1 + \sum_{i=1}^{P} a_i \cdot \alpha^i \cdot z^{-i}, i = 1, 2, \ldots, P \quad (7)$$

here, $\{a_i, i=1, 2, \ldots, P\}$ are LPC coefficients obtained from LPC analysis on unquantized original signal or quantized original signal. Sometimes, several controlling parameters are used to determine a weighting filter; such a popular example of the weighting filter could be $$W(z, \alpha, \beta) = \frac{A(z/\alpha)}{A(z/\beta)}, \quad (8)$$

where $\beta<\alpha$. Another popular weighting filter is like, $$W(z, \alpha, \beta) = \frac{A(z/\alpha)}{1 + \beta \cdot z^{-1}}, \quad (9)$$

Due to special quantization error structure (shown in FIG. 6) produced by G.711 codec, any weighting filter with constant controlling parameter(s) will not achieve the best performance; it means, when the perceptual quality is improved for certain level signal, it might not or even be degraded for another level of signal. Since the relationship between the quantization error statistics and signal level (as shown in FIG. 6) can be found, the best way to achieve the best perceptual quality is to make the weighting filter controlling parameter (s) adaptive; at least they should be adaptive to the signal level or adaptive to the relative quantization error statistics. From FIG. 6, it can been seen that when the signal level is very low, the relative error is very large. When the relative quantization error is larger (or when the signal level is very low), the perceptual weighting should be "stronger"; when the relative quantization error is smaller (or when the signal level is high), the perceptual weighting should be "weaker". With the specific weighting filter example of (7), "stronger" means $\alpha$ is smaller; "weaker" means $\alpha$ is bigger.

The above description contains specific information pertaining to the adaptive weighting filter parameter control. However, one skilled in the art will recognize that the present invention may be practiced in conjunction with various encoding/decoding algorithms different from those specifically discussed in the present application. Moreover, some of the specific details, which are within the knowledge of a person of ordinary skill in the art, are not discussed to avoid obscuring the present invention.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

What is claimed is:

1. A method of improving a perceptual weighting filter $W(z)$ or a perceptual noise shaping filter $F(z)=W(z)-1$, used to enhance perceptual performance of a G.711 codec, the method comprising:
   i. inputting an unquantized signal sample to a G.711 encoder;
   ii. encoding said unquantized signal via the G.711 encoder to produce a coded bitstream using $W(z)$ or $F(z)$ as follows:

$$W(z) = A(z/\alpha) = 1 + \sum_{i=1}^{P} a_i \cdot \alpha^i \cdot z^{-i}, i = 1, 2, \ldots, P$$

$$F(z) = W(z) - 1 = \sum_{i=1}^{P} a_i \cdot \alpha^i \cdot z^{-i}, i = 1, 2, \ldots, P$$

$$A(z) = 1 + \sum_{i=1}^{P} a_i \cdot z^{-i}, i = 1, 2, \ldots, P$$

where $A(z)$ is an LP (Linear Prediction) predictor obtained from analyzing an input signal, $\{a_i, i=1, 2, \ldots, P\}$ are the LP predictor coefficients, P is the LP predictor order and $\alpha$ is a controlling parameter controlling $W(z)$ or $F(z)$,
   wherein the controlling parameter $\alpha$ depends on an input signal level;
   when the input signal level becomes low (towards zero), $\alpha$ is towards 0;
   iii. receiving said bitstream at a decoder; and
   iv. outputting an enhanced decoded signal.

2. The method of claim 1, wherein the G.711 codec performs as a core layer of a scalable coder.

3. The method of claim 1, wherein the G.711 codec is compatible with ITU (International Telecommunication Union) G.711 A-law or µ-law codec standard.

4. A method of improving a perceptual weighting filter $W(z)$ or a perceptual noise shaping filter $F(z)=W(z)-1$, used to enhance perceptual performance of a G.711 codec, the method comprising:
   i. inputting an unquantized signal sample to a G.711 encoder;
   ii. encoding said unquantized signal via the G.711 encoder to produce a coded bitstream using $W(z)$ or $F(z)$ as follows:
   $W(z)$ or $F(z)$ is controlled by one or several parameters;
   at least one of the parameters controlling $W(z)$ or $F(z)$ depends on an input signal level;
   when the input signal level becomes low (towards zero), $W(z)$ is towards 1 or equivalently $F(z)$ is towards 0;
   iii. receiving said bitstream at a decoder; and
   iv. outputting an enhanced decoded signal.

5. The method of claim 4, wherein the perceptual weighting filter $W(z)$ or the perceptual noise shaping filter $F(z)$ is defined by the following equations:

$$W(z) = A(z/\alpha) = 1 + \sum_{i=1}^{P} a_i \cdot \alpha^i \cdot z^{-i}, i = 1, 2, \ldots, P$$

$$F(z) = W(z) - 1 = \sum_{i=1}^{P} a_i \cdot \alpha^i \cdot z^{-i}, i = 1, 2, \ldots, P$$

$$A(z) = 1 + \sum_{i=1}^{P} a_i \cdot z^{-i}, i = 1, 2, \ldots, P$$

where $A(z)$ is an LP (Linear Prediction) predictor obtained from analyzing an input signal, $\{a_i, i=1, 2, \ldots, P\}$ are the LP predictor coefficients, P is the LP predictor order and $\alpha$ is the controlling parameter controlling $W(z)$ or $F(z)$.

6. The method of claim 4, wherein the perceptual weighting filter W(z) or the perceptual noise shaping filter F(z) is defined by the following equations:

$$W(z) = \frac{A(z/\alpha)}{A(z/\beta)}$$

$$F(z) = W(z) - 1$$

$$A(z) = 1 + \sum_{i=1}^{P} a_i \cdot z^{-i}, i = 1, 2, \ldots, P$$

where A(z) is an LP (Linear Prediction) predictor obtained from analyzing an input signal; $\{a_i, i=1, 2, \ldots, P\}$ are the LP predictor coefficients; P is the LP predictor order; $\alpha$ and $\beta$ ($\beta<\alpha$) are the controlling parameters controlling W(z) or F(z).

7. The method of claim 4, wherein the perceptual weighting filter W(z) or the perceptual noise shaping filter F(z) is defined by the following equations:

$$W(z) = \frac{A(z/\alpha)}{1 + \beta \cdot z^{-1}}$$

$$F(z) = W(z) - 1$$

$$A(z) = 1 + \sum_{i=1}^{P} a_i \cdot z^{-i}, i = 1, 2, \ldots, P$$

where A(z) is an LP (Linear Prediction) predictor obtained from analyzing an input signal; $\{a_i, i=1, 2, \ldots, P\}$ are the LP predictor coefficients; P is the LP predictor order; $\alpha$ and $\beta$ ($\beta<\alpha$) are the controlling parameters controlling W(z) or F(z).

8. The method of claim 4, wherein the G.711 codec performs as a core layer of a scalable coder.

9. The method of claim 4, wherein the G.711 codec is compatible with ITU (International Telecommunication Union) G.711 A-law or µ-law codec standard.

\* \* \* \* \*